United States Patent [19]

Giacomin et al.

[11] Patent Number: 5,988,361
[45] Date of Patent: Nov. 23, 1999

[54] SPLIT LOAD CRADLE FOR CONVEYOR BELTS

[75] Inventors: Renato Antônio Giacomin; Antônio Carlos De Oliveira Santana, both of Vitória; Geraldo Magela De Azevedo; Edson Carlos Da Silva, both of Vila Velha; Eustáquio Mafra, Vitória, all of Brazil

[73] Assignee: Companhia Vale Do Rio Doce, Minas Gerais, Brazil

[21] Appl. No.: 09/006,966

[22] Filed: Jan. 14, 1998

[30] Foreign Application Priority Data

Oct. 30, 1997 [BR] Brazil .................................. 7702151 U

[51] Int. Cl.⁶ .................................................. B65G 15/08
[52] U.S. Cl. ............................................................ 198/830
[58] Field of Search ............................................. 198/830

[56] References Cited

U.S. PATENT DOCUMENTS 5,564,557  10/1996  Spencer ..................................... 198/830

FOREIGN PATENT DOCUMENTS 2109327  6/1983  United Kingdom ................... 198/830

Primary Examiner—William E. Terrell
Assistant Examiner—Joe Dillon, Jr.
Attorney, Agent, or Firm—Helfgott & Karas, P C.

[57] ABSTRACT

A split load cradle for conveyor belts comprised of two pipes (1 and 2) is disclosed. The longer pipe (1) incorporates vertical arms (3, 4 and 5) having an upper ends obliquely facing each other wherein the end rolls (11) of the load cradle (10) are pivoted. Between the shorter arm (5) and the shorter arm (4) an intermediary roll (12) is also pivoted between. The second shorter pipe (2) is just like the first longer pipe (1). Both longer and shorter pipes (1 and 2) are longitudinally split in their lower part by a narrow slot (6) and fit said pipes around and axially into another pipe (7) having a lower diameter. This arrangement is attached to the structure (8) of the conveyor belt (T).

6 Claims, 2 Drawing Sheets

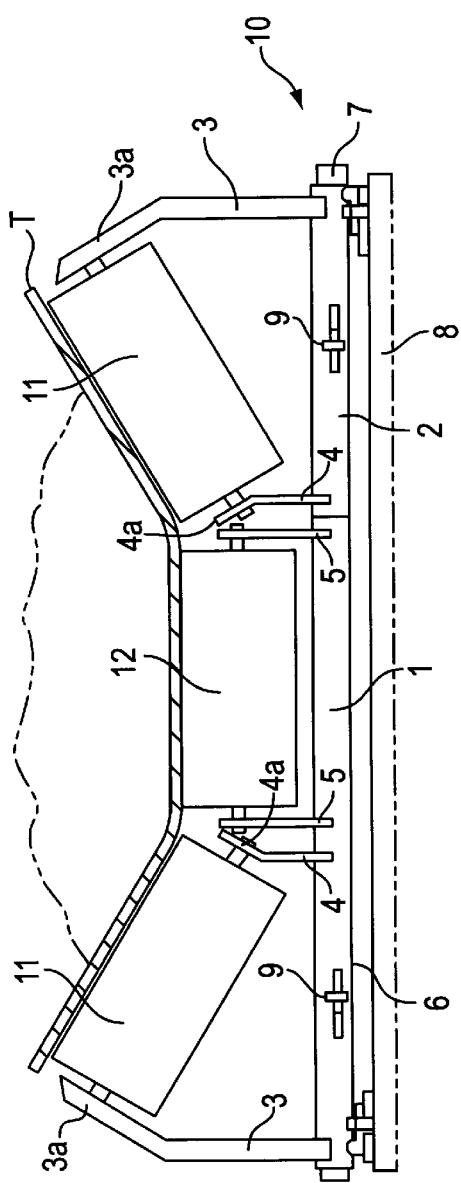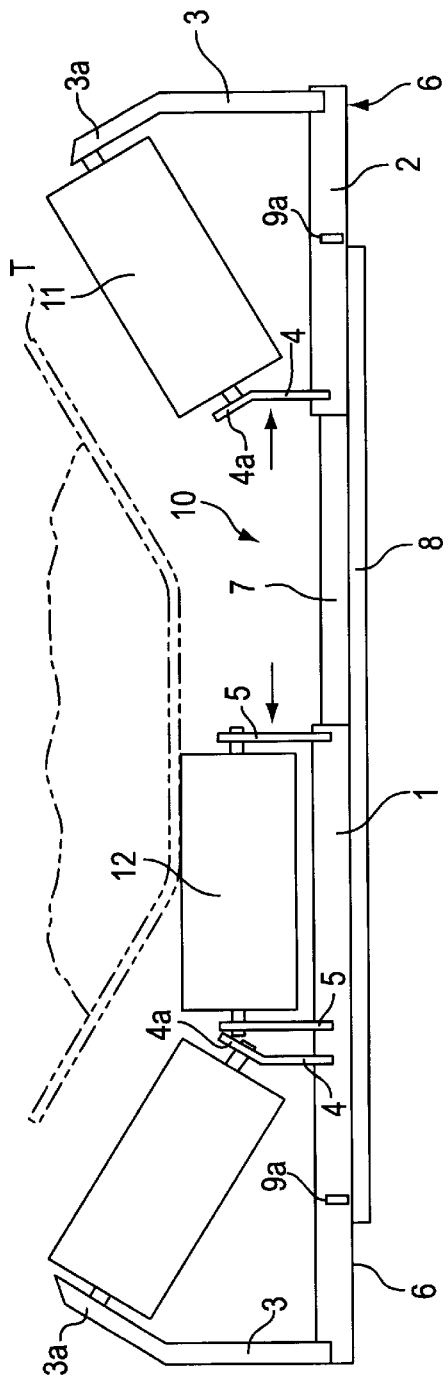

SPLIT LOAD CRADLE FOR CONVEYOR BELTS

FIELD OF THE INVENTION

The present invention comprises a split load cradle for conveyor belts, and more specifically improved constructive arrangement in a split load cradle for conveyor belts that makes it possible the disassemblement even during its operation.

BACKGROUND OF THE INVENTION

It is known by those skilled in the art, that conveyor belts are moved on tubular rolls supported by transversely disposed structures under said conveyor belt wherein said structures called cradles are fixed to the steel frame that supports the conveyor belt by means of bolts. In spite of the large use, said arrangement brings forth a substantial difficulty and provides a relevant idleness to the conveyor belts when they have to be removed in order to perform preventive or corrective maintenance services on the load rolls disposed under the conveyor belts.

To replace the rolls which are encased in the cradles it is necessary preliminary to stop the conveyor belt so that it may be possible to remove the bolts attaching the cradles to the steel frame, and than the cradle must be tumbled for replacing the load rolls (rollers). At least two operators are required to carry out this replacement.

The roll replacement becomes even more complex when it is carried out in a small and/or in other hard-to-reach areas.

The shutdown of the conveyor belt, for example, in an ore processing industry, when necessary for the roll maintenance requires the shutdown of the pelletizing step and discontinuing the production, what is too detrimental.

In addition, it should de emphasized that there is a great lack of safety in the removal of the cradle, since the mechanician is continuously exposed to the risk of accident.

SUMMARY OF THE INVENTION

One object of the present invention is to provide a split load cradle for conveyor belts that can result in an improvement in the work conditions plus more safety and less maintenance workers.

Another object of this invention is to provide a split load cradle for conveyor belts that optimizes the operations for the roll replacement in conveyor belts.

Another object of this invention is to provide a split load cradle for conveyor belts that minimizes the risks of accident when maintenance services are performed even where the belts are in hard-to-reach places.

Another object of this invention is to provide a split load cradle for conveyor belts that reduces the time spent for replacing the rolls in view of the easy way to handle the new cradle.

These and other objects of the present invention can be met by a split load cradle for conveyor belts assembled on a pipe to be encased into another pipe that is in turn attached to the structure of the conveyor belt through pin and wedge, thus eliminating bolts.

BRIEF DESCRIPTION OF THE DRAWINGS

The present invention will be described with reference to the drawings which is an illustrative example of a preferred embodiment of the invention.

FIG. 2 is a front view of the split load cradle assembled under the conveyor belt loaded with particulate material during transportation.

FIG. 3 is a front view of the split load cradle being disassembled under the conveyor belt loaded with particulate material, the latter being shown by broken lines.

DETAILED DESCRIPTION OF THE INVENTION

Figure 1:
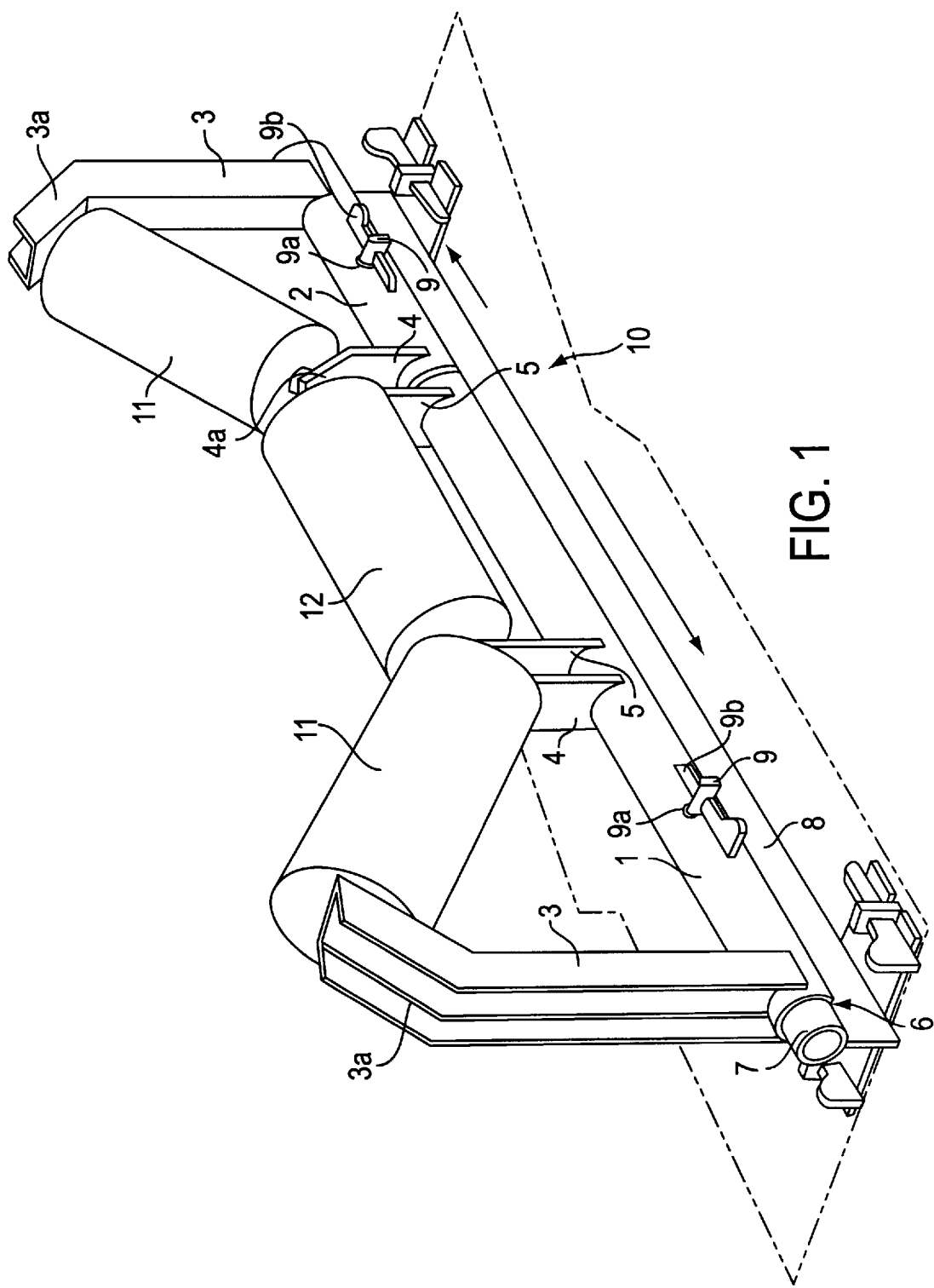
FIG. 1 is a perspective view of the split load cradle for conveyor belts wherein the black arrows show the direction of movement of its movable component parts.

According to the cited illustrations, the split load cradle for conveyor belts object of this improvement comprises two pipes 1 and 2. The longer pipe I has vertical arms 3, 4 and 5 produced of shaped plates, the longer arm 3 having a U-shaped cross-section and which is disposed at the outer end of pipe 1 has its upper end 3a obliquely facing the shorter I-shaped arm 4 which is disposed half-way along said pipe 1. The shorter I-shaped arm 4 has the upper end 4a also obliquely folded parallel to the upper end 3a of the longer arm 3, so that between said shorter I-shaped arm 4 and said longer arm 3 one of the oblique end rolls Il can be pivoted in the load cradle 10 over which conveyor belt T is placed.

A pair of shorter I-shaped arms 5 is located adjacently to the shorter arm 4 each one placed near the shorter I-shaped arm 4 and near the inner end of pipe 1, respectively. Between this pair of shorter I-shaped arms 5 is pivoted a horizontal intermediary roll 12.

The second pipe 2 which has a shorter length, as the cited longer pipe 1 is provided with vertical arms 3 and 4 which consist of shaped plates. The longer arm 3 having a U-shaped cross-section and being disposed at the outer end of pipe 2 has its upper end 3a obliquely facing the shorter I-shaped arm 4 disposed half-way along pipe 2 with its upper end 4a also obliquely folded parallel to the upper end 3a of the longer arm 3. In such a way, said third oblique end roll 11 can be pivoted in the load cradle 10.

Both longer and shorter pipes 1 and 2 are longitudinally split in their lower part by a narrow slot 6 that making it possible to fit said pipes around and axially into another pipe 7 having a lower diameter. This pipe 7 is attached to the structure 8 of conveyor belt T, wherein said movable pipes 1 and 2 are axially attached to said fixed pipe 7 by means of the transverse flat pin 9 which simultaneously passes through holes 9a provided on the pipes 1, 2 and 7 and is locked by a wedge 9b. This arrangement eliminates the need of bolts.

As shown in the embodiment of the Figures, the replacement of rolls 11 and 12 of the cradle 10 is extremely easy and can be carried out in completely safe way by only one mechanician without the need to stop the conveyor belt T.

We claim:

1. A split load cradle for conveyor belts comprising at least two pipes, the longer of said pipe having vertical arms consisting of shaped plates, the longer arm being disposed at the outer end of said longer pipe and having an upper end obliquely facing a first shorter arm disposed half-way along said long pipe; the first shorter arm having an upper end also obliquely folded parallel to the upper end of the longer arm; so that between said first shorter arm and said longer arm an oblique end rolls is pivotally in the load cradle over which a conveyor belt is placed; a pair of shorter arms is disposed between said first shorter arm and the inner end of longer pipe, wherein a horizontal intermediate roll is pivotally mounted between them; the shorter pipe having vertical arms as defined for the longer pipe wherein the longer arm disposed at the outer end of shorter pipe has the upper end obliquely facing the shorter arm disposed at the inner end of the shorter pipe and having its upper end also obliquely folded parallel to the upper end of the longer arm, so that a third oblique end roll of the load cradle is pivotally mounted between said longer and shorter arm of said shorter pipe.

2. A split load cradle for conveyor belts as claims 1, wherein said movable pipes are axially attached to a fixed pipe having a lower diameter by a transverse flat pin that simultaneously passes through holes provided in the pipes wherein are locked by a wedge.

3. A split load cradle for conveyor belts as claim 1, wherein both longer and shorter pipes are longitudinally split in their lower part.

4. A split load cradle for conveyor belts as claim 3, wherein longer and shorter pipes are split by a narrow slot.

5. A split load cradle for conveyor belts as claims 1, wherein it is possible to fit said longer and shorter pipes around and axially into another pipe having a lower diameter.

6. A split load cradle for conveyor belts as claim 5, wherein said pipe having a lower diameter is attached to a structure of the conveyor belt.

* * * * *